United States Patent [19]
Mao

[11] Patent Number: 5,924,037
[45] Date of Patent: Jul. 13, 1999

[54] FREQUENCY ASSIGNING METHOD IN A SEVEN CELL FREQUENCY PLAN FOR A CELLULAR COMMUNICATIONS SYSTEM WITHOUT ADJACENT FREQUENCIES

[75] Inventor: Tom Mao, Plano, Tex.

[73] Assignee: Ericsson, Inc., Research Triangle Park, N.C.

[21] Appl. No.: 08/775,835

[22] Filed: Dec. 31, 1996

[51] Int. Cl.$^6$ ................................................ H04Q 7/00
[52] U.S. Cl. .................................... 455/447; 455/446
[58] Field of Search .............................. 455/446, 447, 455/448, 449, 450, 422, 509, 62, FOR 104; 370/335, 329, 310

[56] References Cited

U.S. PATENT DOCUMENTS

| | | |
|---|---|---|
| 5,111,534 | 5/1992 | Benner . |
| 5,247,699 | 9/1993 | Hartman ................................. 455/447 |
| 5,402,413 | 3/1995 | Dixon ..................................... 455/447 |
| 5,483,667 | 1/1996 | Faruque . |
| 5,703,874 | 12/1997 | Schilling ................................ 370/335 |

OTHER PUBLICATIONS

Gamst, Andres, "Homogeneous Distribution of Frequencies in a Regular Hexagonal Cell System", IEEE, vol. VT–31, No. 3, pp. 132–144, 1982.

Stjernvall, Jan–Erik, "Calculation of Capacity and Co–Channel Interference in a Cellular System", Nordic Seminar on Digital Land Mobile Radiocommunication, Espoo, Finland, Feb. 5–7, 1985.

Arnaud, Jean–Francois, "Frequency Planning for Broadcast Services in Europe", IEEE, vol. 68, No. 12, pp. 1515–1522, Dec. 1980.

Hale, William K., "Frequency Assignment: Theory and Applications", IEEE, vol. 68, No. 12, pp. 1497–1514, Dec. 1980.

Mac Donald, V. H., "Advanced Mobile Phone Service: The Cellular Concept", American Telephone and Telegraph Company, The Bell System Technical Journal, vol. 58, No. 1, pp. 15–41, Jan. 1979.

"Fundamentals of Cellular Communications", Chapter 5, pp. 79–97.

Frenkiel, Richard H., "A High–Capacity Mobile Radiotelephone System Model Using a Coordinated Small–Zone Approach", IEEE Transactions on Vehicular Technology, vol. VT–19, No. 2, pp. 173–177, May 1970.

*Primary Examiner*—Doris H. To
*Attorney, Agent, or Firm*—Jenkens & Gilchrist, P.C.

[57] ABSTRACT

A cell cluster for use with a frequency re-use pattern is disclosed. The cell cluster comprises seven antenna sites arranged in first and second adjacent columns having four sites associated with the first column and three sites associated with the second column. Frequency groups are assigned to each of the antenna sites such that no adjacent channel interference exist between the antenna sites or between any similarly configured cell clusters associated with the cell cluster.

22 Claims, 6 Drawing Sheets ns: 5,924,037

FREQUENCY ASSIGNING METHOD IN A SEVEN CELL FREQUENCY PLAN FOR A CELLULAR COMMUNICATIONS SYSTEM WITHOUT ADJACENT FREQUENCIES

BACKGROUND OF THE INVENTION

1. Technical Field of the Invention

The present invention relates to frequency re-use structures, and more particularly, to a frequency re-use structure, including seven cell clusters that substantially eliminates adjacent channel interference.

2. Description of Related Art

Frequency re-use patterns are cell-based structures by which the frequency channels within a cellular radio system are assigned. The most basic unit of any frequency re-use pattern is a cell. To each cell in a frequency re-use pattern are assigned a number of frequency channels. A group of cells associated together are referred to as a cluster. A cluster contains all of the frequency channels available to a particular cellular radio system. Groups of clusters are then used to provide a cellular coverage over a specific area for a cellular system. The association of all frequency channels within a single cluster enables the re-use of the frequency channels throughout the cellular system.

The clusters are structured and frequencies within the clusters assigned to increase the re-use distance and limit co-channel and adjacent channel interferences. Co-channel interference consists of interference caused between uses of the same frequency within two different cell clusters. Adjacent channel interference is caused by interference between adjacent frequency channels within the same cluster or within two different clusters. In order to reduce interference within the cellular system, both co-channel and adjacent channel interference must be minimized. Competing with these requirements is the need for increased system capacity. In general, the smaller number of cells used in a cluster within a mobile radio system, the higher the capacity of the system and the lower the co-channel re-use distance. A smaller co-channel re-use distance, of course, increases co-channel interference.

Frequency re-use patterns have been extensively studied in the cellular industry. Frequency re-use patterns minimizing adjacent channel interference have been proposed for cell clusters of greater than nine cells in size. However, claims have been made in existing studies, that adjacent channel interference may not be avoided when the number of cells in a cluster is less than nine. Existing frequency re-use patterns using less than nine cells, all suffer from the problem of adjacent channel interference. A system which enabled the use of clusters including less than nine cells with enhance channel capacity, provided good co-channel interference characteristics and substantially eliminated adjacent channel interference problems would greatly benefit users and providers of cellular telephone services.

SUMMARY OF THE INVENTION

The present invention overcomes the foregoing and other problems with an improved cell cluster for use with a frequency re-use pattern. In a first embodiment, the cell cluster consists of seven cells arranged in first and second adjacent horizontal, vertical or diagonal columns. The first column includes four cells while the second column comprises three cells. Seven different frequency groups are assigned to each of the seven cells. Each frequency group consists of non-adjacent frequency channels, and the assignment of the seven frequency groups is such that there are no adjacent channels between any of the seven cells, nor are there adjacent channels with any similarly configured cell clusters associated with the seven cell cluster.

The above-described cell cluster works with an omni-directional configuration wherein seven omni-directional antennas are located at the center of each of the seven cells or with a center excited, sectorized antenna configuration wherein each of the seven frequency groups further includes three sub-groups. Each of the sub-groups associated with a frequency group do not include any adjacent frequency channels.

In a second embodiment, seven antenna sites are arranged in first and second adjacent columns or rows wherein the first column or row includes four antenna sites and the second column includes three antenna sites. Each antenna site has three cells associated therewith and each cell employs three directional antennas and forms a twenty-one cell cluster. Located at each antenna site are sectorized three-sector antennas transmitting into the three cells associated with the antenna site. Seven frequency groups consisting of three sub-groups having no adjacent frequency channels are assigned to each of the antenna sites with each cell receiving a sub-group such that there are no adjacent frequency channels between any of the twenty-one cells associated with the seven antenna sites and no adjacent channels with any similarly configured cell cluster associated with the cell cluster.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
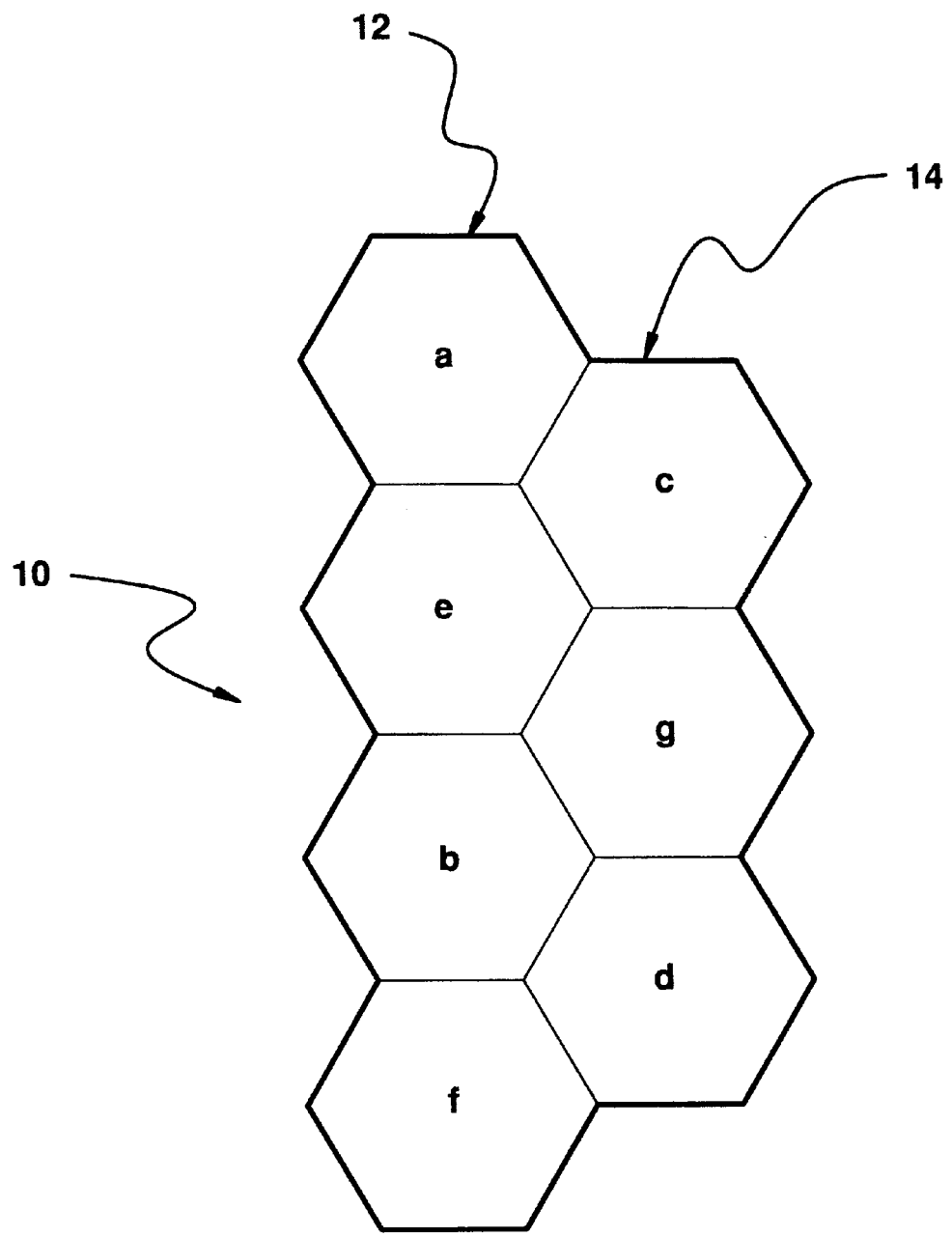
FIG. 1 is a diagram of the seven cell cluster using the omni-directional antenna configuration that provides no adjacent channel interference within the same cluster.

Referring now to the Drawings, and more particularly, to FIG. 1, there is illustrated the basic cluster for an N=7, omni-directional pattern, where N equals the frequency re-use number (the number of cells) in a cluster. The pattern is a rectangular shaped cell cluster 10 having four vertically aligned cells 12 immediately adjacent to three vertically aligned cells 14. This pattern and the frequency assignment scheme associated therewith, which will be more fully discussed in a moment, provide all the basic properties of a conventional re-use pattern, such as, repeatability, splitability, and applicability. Alternatively, the two columns 12, 14 of four and three cells may be arranged horizontally or diagonally rather than vertically.

The proposed N=7 frequency plan for an omni-directional antenna site as shown in FIG. 1, is based on dividing all the available frequency channels into seven or multiples of seven frequency groups with approximately t/7 channels per group, where t is the total number of available channels in the spectral band designated by the authority. Table 1 shows the channel assignments for an omni-directional antenna systems.

TABLE 1

| Frequency Channel Group | | | | | | |
|---|---|---|---|---|---|---|
| a | b | c | d | e | f | g |
| Channel | | | | | | |
| Number | 1 | 2 | 3 | 4 | 5 | 6 | 7 |
| | 8 | 9 | 10 | 11 | 12 | 13 | 14 |
| | 15 | 16 | 17 | 18 | 19 | 20 | 21 |

As can be seen from Table 1, each of the frequency channels are assigned sequentially to each frequency channel group. A frequency channel group is then associated with each cell in a manner that eliminates adjacent frequency channels within the cluster and with adjacent clusters. These same frequencies after being assigned to a first cluster may then be re-used by other clusters according to the same assignment configuration in order to provide cellular coverage over a specific area.

The basic seven cell cluster uses an odd and even channel distribution scheme wherein the odd and even channels in the basic cluster form two vectors, A and B, as follows:

$$A = \begin{bmatrix} a \\ e \\ b \\ f \end{bmatrix} B = \begin{bmatrix} c \\ g \\ d \end{bmatrix}$$

$$A = \begin{bmatrix} f \\ b \\ e \\ a \end{bmatrix} B = \begin{bmatrix} d \\ g \\ c \end{bmatrix}$$

Vector A contains four frequency channel groups and Vector B contains three frequency channel groups. Vector A is assigned to the four cell column and Vector B is assigned to the three cell column. As can be seen, the adjacent frequency channel groups are offset by at least one other frequency channel group to eliminate the possibility of adjacent frequencies in the vertical direction. Thus, Groups a-b, e-f, and c-d are each separated from each other by one other group. The adjacent frequency channels group are also horizontally offset by at least one other frequency channel group to eliminate the possibility of adjacent frequencies in the horizontal direction. Thus, groups b-c, b-e, f-g and a-g are each separated from each other by one frequency group.

Figure 2:
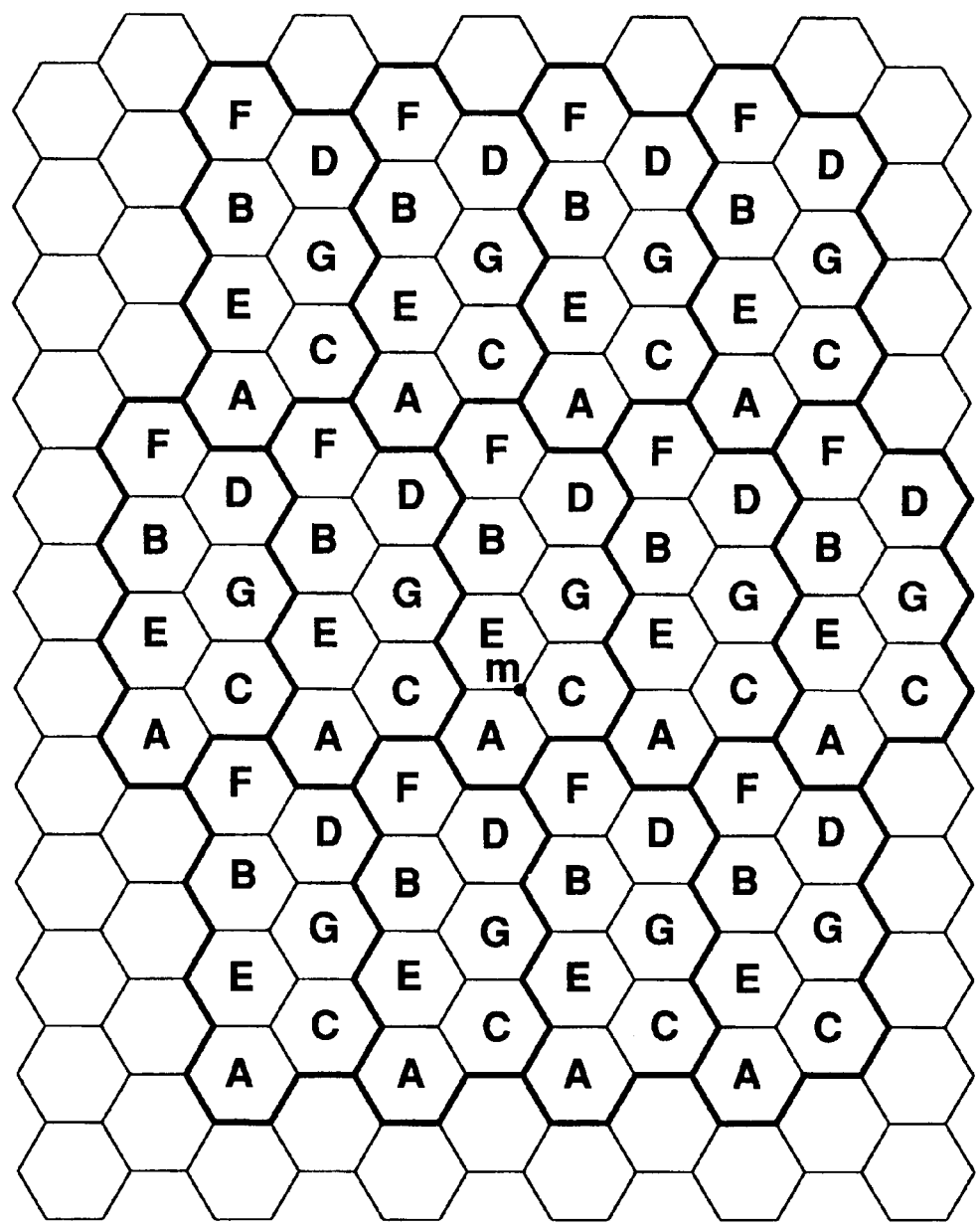
FIG. 2 is an illustration of the frequency re-use plan for an N=7 cell cluster using the omni-directional antenna configuration that provides no adjacent channel interference between two different clusters.

The seven cell cluster is associated in a frequency reuse pattern as shown in FIG. 2. With each cluster, the assigned channel frequencies for the cellular system are reused. Due to the basic cluster shape of the N=7, omni-directional antenna site, it is only possible to expand the basic cluster in the vertical and horizontal directions. This provides a frequency group repeating sequence for the structure of FIG. 2, that limits co-channel interference and eliminates adjacent channel interference as shown below in Table 2.

TABLE 2

| a | c | a | c | a | c |
|---|---|---|---|---|---|
| e | g | c | g | e | g |
| b | d | b | d | b | d |
| f | a | f | a | f | a |
| c | e | c | e | c | e |
| g | b | g | b | g | b |
| d | f | d | f | d | f |
| a | c | a | c | a | c |
| e | g | c | g | e | g |
| b | d | b | d | b | d |
| f | a | f | a | f | a |
| c | e | c | e | c | e |
| g | b | g | b | g | b |
| d | f | d | f | d | f |

As can be seen from Table 2, the co-channels in the horizontal direction are always one cell apart (with center-to-center distance of 3R) from the serving cell on each side, where R is the cell radius of each cell. The co-channels in the vertical direction are always six cells (with center-to-center distance of 14R) apart, and the co-channels on the diagonal direction are separated by one frequency shift in the horizontal direction and three frequency shifts in the vertical direction with (center-to-center distance of $\sqrt{39}R$) The co-channel cells on the diagonal are symmetrical from left to right and also from top-to-bottom with reference to the serving cell. This provides co-channel interference performance that is on par with or slightly better than a normal seven cell cluster configuration.

The most important feature of this N=7 omni-directional antenna pattern is that it is free of adjacent channel interference within the cluster, as well as, with two different clusters. Thus, while this particular frequency re-use pattern provides same traffic capacity as a normal N=7 system, the freedom from adjacent channel interference greatly reduces the total interference within a mobile telecommunications system. This is due to the fact that in a mobile telecommunications system, interference or both consists of the noise plus adjacent channel interference, plus co-channel interference. Since the noise is limited in a mobile telecommunications environment, this means either the adjacent channel or co-channel interference must be reduced. Since this configuration provides approximately equal or slightly better co-channel interference, the elimination of adjacent channel interference improved system performance.

The frequency re-use pattern of the present invention may also be used with a sectorized antenna cell configuration. This configuration would use, for example, 21 frequency groups for a three sector cell in a seven site re-use pattern having approximately t/21 channels per group, where t equals the total number of available channels in the spectral band. This type of channel assignment is illustrated in Table 3.

TABLE 3

| | Frequency Channel Group | | | | | | | | | | | | | | | | | | | | |
|---|---|---|---|---|---|---|---|---|---|---|---|---|---|---|---|---|---|---|---|---|---|
| | a1 | b1 | c1 | d1 | e1 | f1 | g1 | a2 | b2 | c2 | d2 | e2 | f2 | g2 | a3 | b3 | c3 | d3 | e3 | f3 | g3 |
| Channel Number | 1 | 2 | 3 | 4 | 5 | 6 | 7 | 8 | 9 | 10 | 11 | 12 | 13 | 14 | 15 | 16 | 17 | 18 | 19 | 20 | 21 |
| | 22 | 23 | 24 | 25 | 26 | 27 | 28 | 29 | 30 | 31 | 32 | 33 | 34 | 35 | 36 | 37 | 38 | 39 | 40 | 41 | 42 |

As can be seen, each frequency group (a, b, c, d, e, f, g) in the omni-directional configuration is divided into three separate sub-groups (a1, a2, a3, b1, b2, b3, c1, c2, c3), and frequency assignments from sub-frequency groups are made to each sector. The sectorized center excited cell and frequency plans are direct extensions of the omni-directional antenna configuration. The frequency group assignment method is the same as that of omni-directional antenna pattern except that each frequency group in the sectorized plan is divided into three subgroups at each location. For example, frequency group a in the omni-directional plan now is divided into frequency groups a1, a2, and a3; frequency group b is divided into frequency groups b1, b2, b3; etc. Frequency groups a1, a2, and a3 are then assigned to the three sectors of a sectorized site. Two different sectorized cell patterns are available, namely the center-excited and clover-leaf cell patterns.

Figure 3:
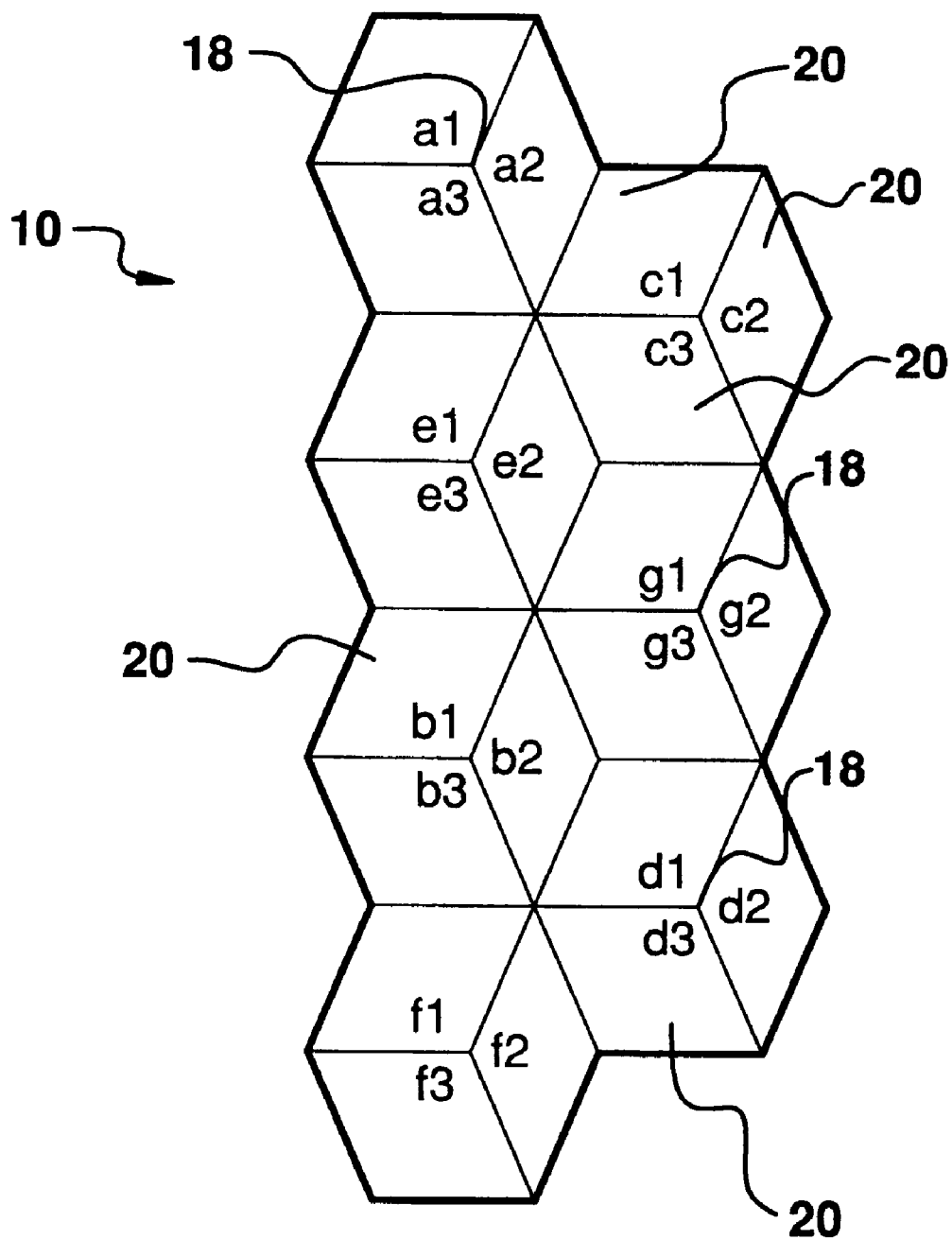
FIG. 3 is an illustration of a center-excited sectorized antenna configuration within an seven-cell cluster based upon, wherein each of the seven frequency groups further includes three separate sub-groups that provide no adjacent channel interference within the same cluster.

FIG. 3, illustrates a cluster of center-excited three sector directional antenna pattern. Each site contains a single antenna site 18 with three sectors 20 having antenna pointing azimuth separated by 120°. It should be understood that while FIG. 3 is described with respect to a three sector configuration other multi-sector configurations may be used. Each sector 20 is approximated by the shape of a rhombi. Each sector 20 can use, for example, 60°, 90° or 120° transmit antenna and two corresponding diversity receiver antennas with the same pointing azimuth. The center-excited three sector patterns splits the hexagon representing the site into three rhombi and assigns a frequency group having three sub-groups to each site. The three subgroups of a channel frequency group are assigned to each sector 20 of the site as is illustrated in FIG. 3.

Figure 4:
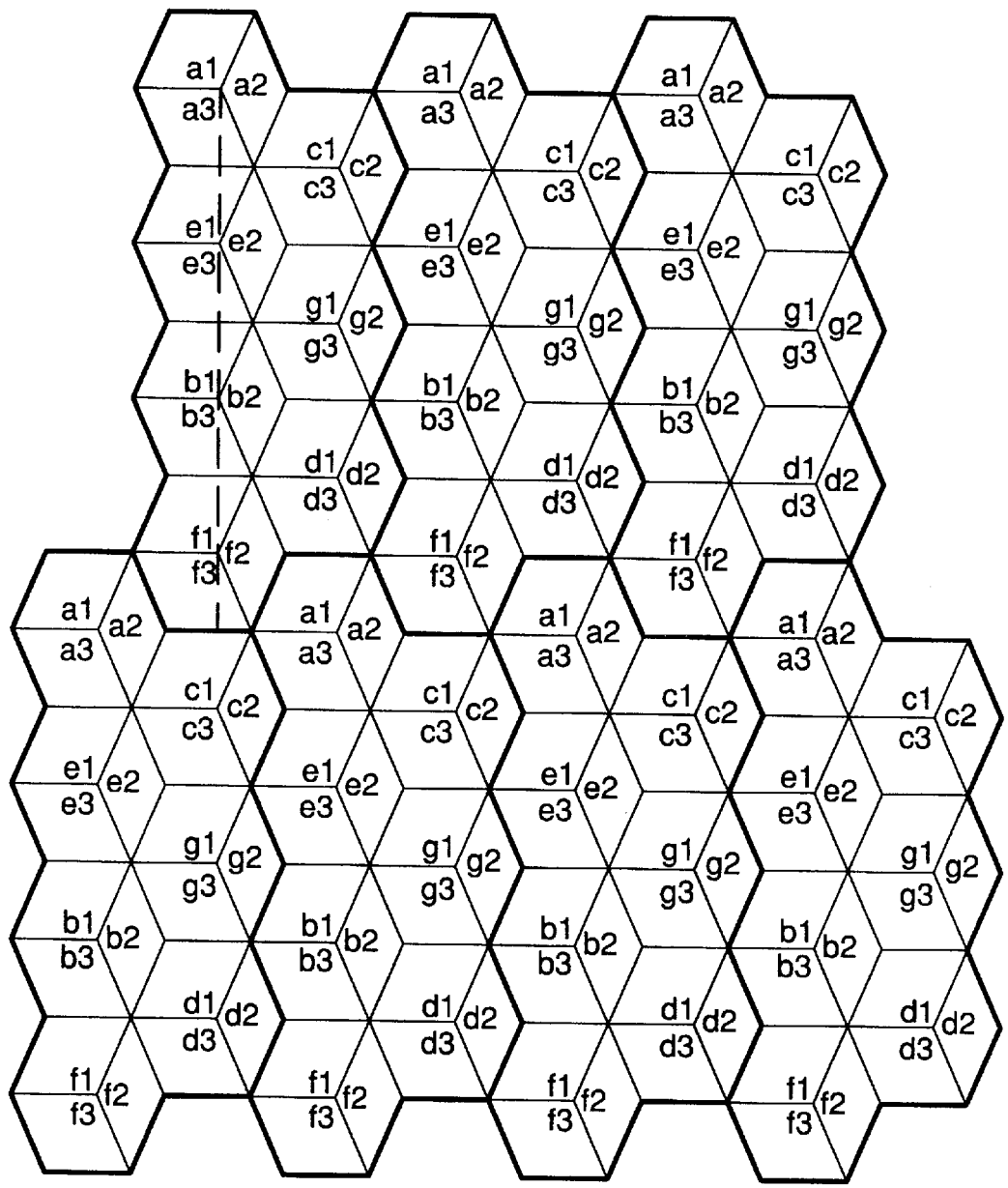
FIG. 4 is an illustration of a frequency re-use pattern for an N=7 cell cluster using the center-excited sectorized antenna configuration that provides no adjacent channel interference between two different clusters.

Referring now to FIG. 4, as with the omni-directional antenna configuration, the cluster shape of the three sector center excited configuration only permits expansion in the vertical and horizontal directions. This configuration provides co-channels separated in the horizontal direction by a distance of 3R (center-to-center) from the serving cell on both sides. Co-channels in the vertical direction are separated by $7\sqrt{3}R$. Co-channels in the diagonal direction are separated by 3R/2 in the horizontal direction and $$\frac{7\sqrt{3R}}{2}$$

in the vertical direction. The co-channels on the diagonal are symmetrical from left to right and also from up to down with reference to the serving cell. Again, as in the omni-directional antenna plan there are no adjacent channels assigned to adjacent cells, sectors or clusters, and thus, no adjacent channel interference.

Figure 5:
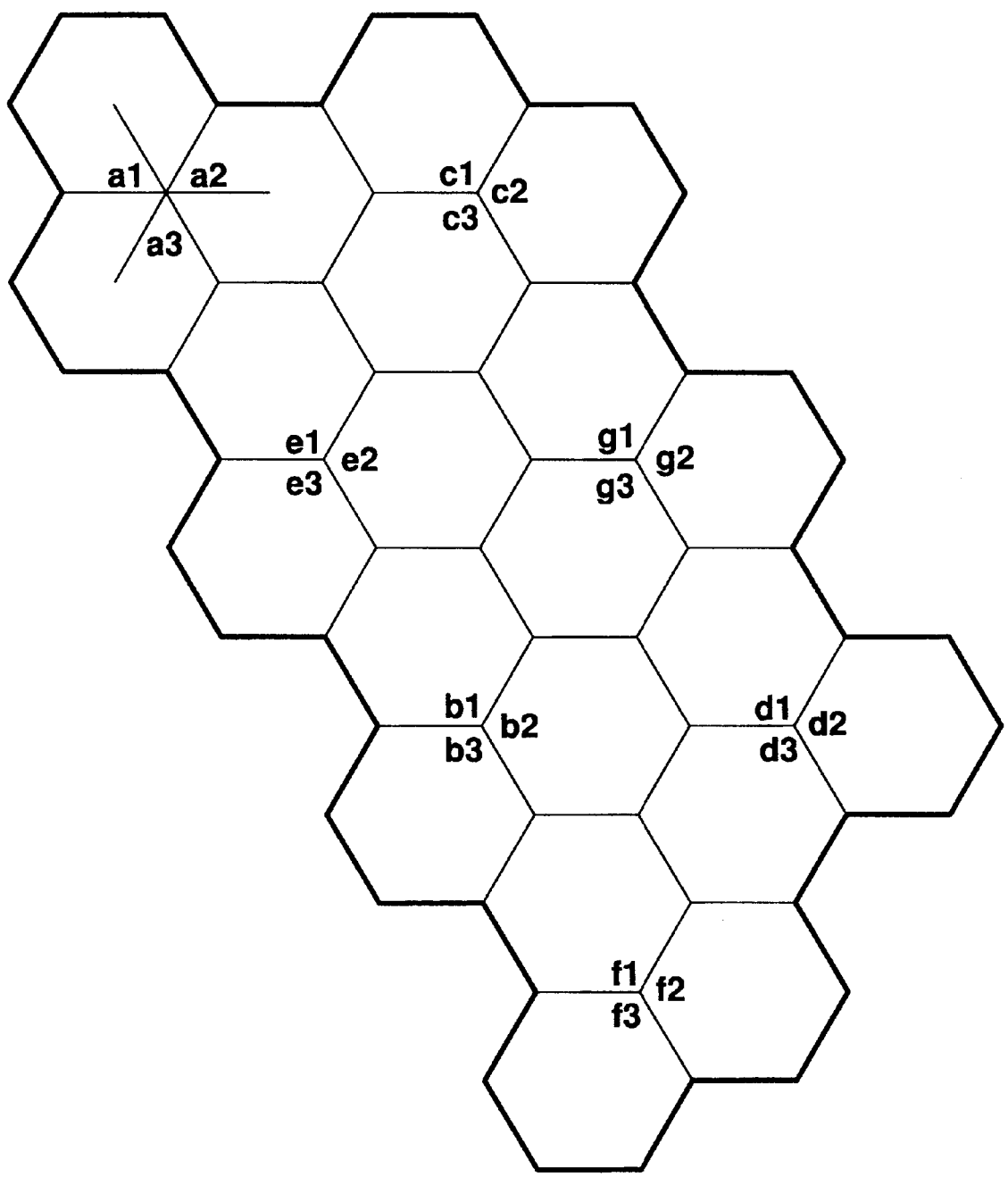
FIG. 5 is an illustration of a clover-leaf configuration using a cluster structure.

Referring now to FIG. 5, there is illustrated the cluster of clover-leaf configuration for a sectorized three sector directional antenna pattern. The site geometry includes three cells at each antenna site wherein the antenna pointing azimuth of each cell is separated by 120° and the cells are arranged in a clover-leaf fashion. Each cell is approximately the shape of a hexagon and uses, for example, 60°, 90° or 120° transmit antenna and two corresponding diversity receiver antennas along each antenna pointing azimuth.

The clover-leaf fashion consists of three cells at the center of which is an antenna. Each antenna site is assigned a frequency group including three sub-groups in the same manner as that discussed with respect to the center excited configuration. Thus, each site would include an assignment of frequency a1, a2, a3; b1, b2, b3; etc., as shown. The relationships for the assigned frequency channel of the seven antenna sites utilized by the clover-leaf pattern is the same as that for the frequency channel assignment relationship with respect to a omni-directional or center-excited sectorized configuration. Rather than being located within the center of a single cell, the antenna site is located at the intersection of three adjacent cells.

Figure 6:
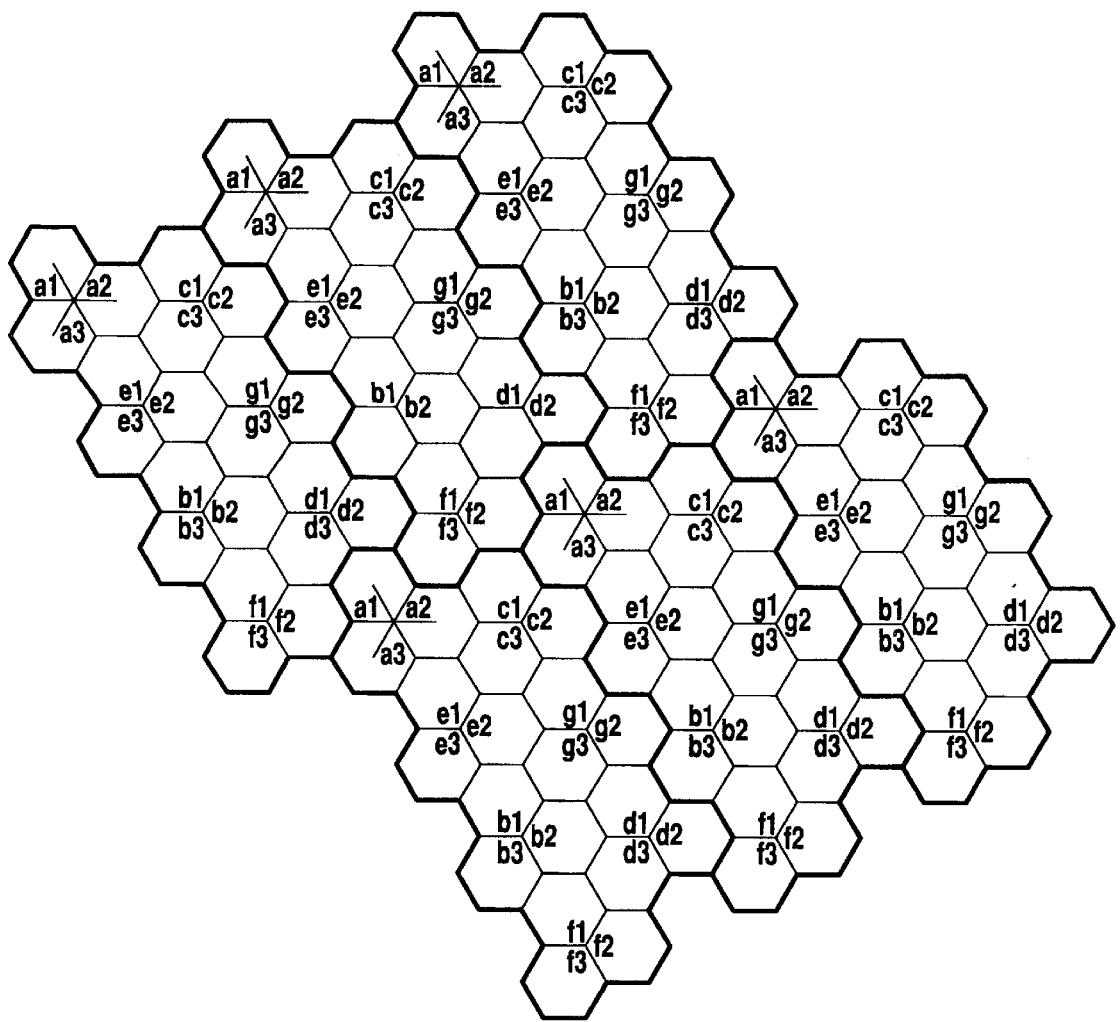
FIG. 6 is an illustration of the frequency re-use pattern for the clover-leaf configuration.

The cluster re-use pattern for a clover-leaf configuration is illustrated in FIG. 6. Due to the basic cluster-shape of the three sectorized clover leaf directional 7/21 plan, it is only possible to expand the basic cluster vertically and horizontally. As can be seen in FIG. 6, the co-channels in the horizontal direction are always separated by a distance of 3 $\sqrt{3}R$ (center-to-center) and 21R in the vertical direction from the serving cell on both sides. The co-channels in the diagonal direction are $3\sqrt{13}R$ apart both upside and downside. There are a total of six co-channel interferers on the first co-channel tier. Again, there are no adjacent channels assigned to adjacent cells or sectors within the cluster and adjacent channel interference does not occur between clusters.

Because of the antenna directivity, the co-channels located on the vertical and diagonal have more impact on the co-channel interference, while the channels located on the horizontal have less impact with respect to the serving cell. However, the co-channels located on the vertical have more distance separation that offsets the impact of the co-channel interference resulting from the antenna directivity.

Although preferred embodiments of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A cell cluster for use with a frequency re-use pattern, wherein the cell cluster comprises:

seven cells arranged in first and second adjacent columns, wherein the first column includes four adjacent cells and the second column includes three adjacent cells; and seven frequency groups assigned to the seven cells such that there are no adjacent channels between any of the adjacent cells once each of the frequency groups are assigned to a cell.

2. The cell cluster of claim 1 wherein location of the seven cells with other similarly arranged clusters of seven cells creates no adjacent channels between cells of any adjacent clusters.

3. The cell cluster of claim 2 wherein the horizontal distance between co-channels is 3R.

4. The cell cluster of claim 2 wherein the vertical distance between co-channels and cells is 14R.

5. The cell cluster of claim 2 wherein the diagonal distance between co-channels is one cell in the horizontal and three cells in the vertical.

6. The cell cluster of claim 1 further including omnidirectional antenna sites associated with each of the seven cells.

7. The cell cluster of claim 1 further including sectorized antenna sites located at the center of each of the seven cells.

8. The cell cluster of claim 7 wherein the horizontal distance between co-channels is 3R.

9. The cell cluster of claim 7 wherein the vertical distance between co-channels and cells is $7\sqrt{3}R$.

10. The cell cluster of claim 7 wherein the diagonal distance between co-channels is 3R/2 in the horizontal and $$\frac{7\sqrt{3R}}{2}$$

in the vertical.

11. The cell cluster of claim 1 wherein the seven frequency groups are designated a, b, c, d, e, f, g, respectively, and all frequency channels are assigned from frequency group a to frequency group g in a repeating and sequential fashion.

12. The cell cluster of claim 11 wherein no two adjacent frequency groups are assigned to physically adjacent cells of the cell cluster.

13. A frequency re-use plan comprising:
a plurality of antenna sites less than nine and more than three associated together in a repeating pattern wherein the number of antenna sites is seven arranged in first and second adjacent columns, wherein the first column includes four adjacent sites and the second column includes three adjacent sites;
a plurality of frequency groups assigned to the antennas such that no two adjacent cells have adjacent frequency channels between them once each of the frequency groups are assigned.

14. The frequency re-use plan of claim 13 wherein each antenna site comprises a sectorized cell transceiving signals in three cells arranged in a clover-leaf pattern.

15. The frequency re-use plan of claim 13 wherein the horizontal distance between co-channels is $3\sqrt{3}R$.

16. The cell cluster of claim 13 wherein the vertical distance between co-channels is 21R.

17. The cell cluster of claim 13 wherein the diagonal distance between co-channels is $3\sqrt{13}R$.

18. A cell cluster for use with a frequency re-use plan comprising:
seven cells arranged in first and second adjacent vertical columns wherein the first column includes four adjacent cell and the second column includes three adjacent cells;
seven frequency groups consisting of non-adjacent frequency channels in each frequency group, wherein each of the seven frequency groups are assigned to one of the seven cells such that there are no adjacent channels between any adjacent cells within the seven cells and with any similarly configured cell cluster associated with the cell cluster.

19. The cell cluster of claim 18 further including omnidirectional antenna sites associated with each of the seven cells.

20. The cell cluster of claim 18 further including sectorized antenna sites located at the center of each of the seven cells.

21. The cell cluster of claim 18 wherein the seven frequency groups are designated a, b, c, d, e, f, g, respectively, and all frequency channels are assigned from frequency group a to frequency group g in a repeating and sequential fashion.

22. The cell cluster of claim 18 wherein the frequency groups comprise three sub-groups having non-adjacent frequency channels assigned thereto.

* * * * *